(12) United States Patent
Archer et al.

(10) Patent No.: US 9,987,808 B2
(45) Date of Patent: Jun. 5, 2018

(54) METHODS FOR FORMATION OF AN OPHTHALMIC LENS WITH AN INSERT UTILIZING VOXEL-BASED LITHOGRAPHY TECHNIQUES

(71) Applicant: Johnson & Johnson Vision Care, Inc., Jacksonville, FL (US)

(72) Inventors: Marina Johns Archer, Jacksonville, FL (US); Michael Ferran, Jacksonville, FL (US); Frederick A. Flitsch, New Windsor, NY (US); Camille A. Higham, Jacksonville, FL (US); Randall Braxton Pugh, St. Johns, FL (US); Michael F. Widman, Jacksonville, FL (US); Christopher Wildsmith, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 671 days.

(21) Appl. No.: 14/087,484

(22) Filed: Nov. 22, 2013

(65) Prior Publication Data
US 2015/0146159 A1    May 28, 2015

(51) Int. Cl.
| | | |
|---|---|---|
| *B29D 11/00* | (2006.01) | |
| *G02C 7/04* | (2006.01) | |
| *B29C 35/02* | (2006.01) | |
| *B29K 83/00* | (2006.01) | |
| *B29K 105/00* | (2006.01) | |
| *B29K 105/24* | (2006.01) | |
| *B29C 35/08* | (2006.01) | |

(52) U.S. Cl.
CPC .... *B29D 11/00038* (2013.01); *B29C 35/0266* (2013.01); *B29D 11/00144* (2013.01); *B29D 11/00153* (2013.01); *B29D 11/00807* (2013.01); *G02C 7/049* (2013.01); *B29C 2035/0833* (2013.01); *B29K 2083/00* (2013.01); *B29K 2105/0002* (2013.01); *B29K 2105/243* (2013.01)

(58) Field of Classification Search
CPC .......... B29C 35/0266; B29D 11/00038; B29D 11/00144; B29D 11/00807; B29D 11/00153; G02C 7/049
See application file for complete search history.

(56) References Cited

U.S. PATENT DOCUMENTS

| | | |
|---|---|---|
| 4,495,313 A | 1/1985 | Larsen |
| 4,701,288 A | 10/1987 | Cook et al. |
| 5,219,497 A | 6/1993 | Blum et al. |

(Continued)

FOREIGN PATENT DOCUMENTS

| | | |
|---|---|---|
| EP | 2604423 A2 | 6/2013 |
| RU | 2116891 C1 | 8/1998 |

(Continued)

*Primary Examiner* — Mathieu Vargot
(74) *Attorney, Agent, or Firm* — Carl J. Evens

(57) ABSTRACT

Methods for manufacturing an ophthalmic lens with an insert using voxel-based lithography techniques, wherein at least a portion of one surface may be free-formed from a reactive mixture are set forth herein. An ophthalmic lens precursor may be formed on a substrate with an arcuate optical quality surface via a source of actinic radiation controllable to cure a definable portion of a volume of reactive mixture, wherein the control may be on a voxel by voxel basis.

13 Claims, 9 Drawing Sheets

(56) References Cited

U.S. PATENT DOCUMENTS

| | | |
|---|---|---|
| 6,217,171 B1 | 4/2001 | Auten |
| 2007/0159562 A1 | 7/2007 | Haddock |
| 2009/0053351 A1* | 2/2009 | Widman .......... B29D 11/00134 425/174.4 |
| 2010/0076553 A1 | 3/2010 | Pugh |
| 2010/0109175 A1 | 5/2010 | Pugh |
| 2012/0187590 A1 | 7/2012 | Widman |

FOREIGN PATENT DOCUMENTS

| | | |
|---|---|---|
| SG | 192338 A1 | 8/2013 |
| SG | 10201400613 A1 | 10/2014 |
| WO | WO2009105261 A1 | 8/2009 |
| WO | WO2012069615 A1 | 5/2012 |

* cited by examiner

510

520

540

530

550

560

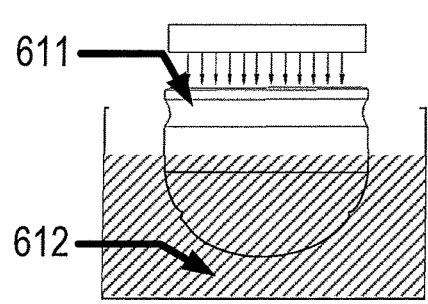
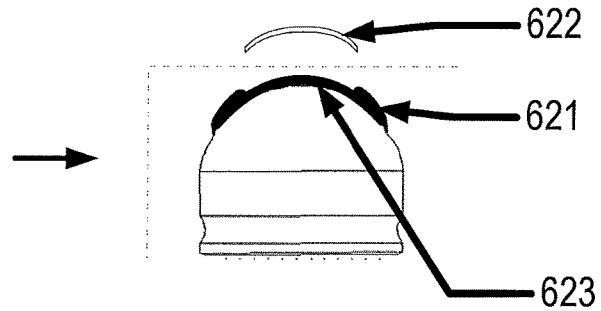
FIG. 6A  FIG. 6B
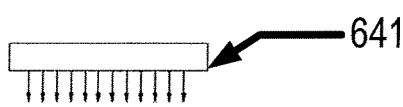
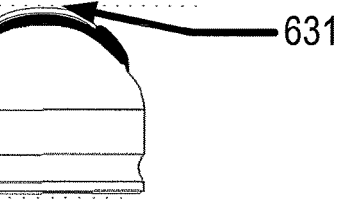
FIG. 6D  FIG. 6C

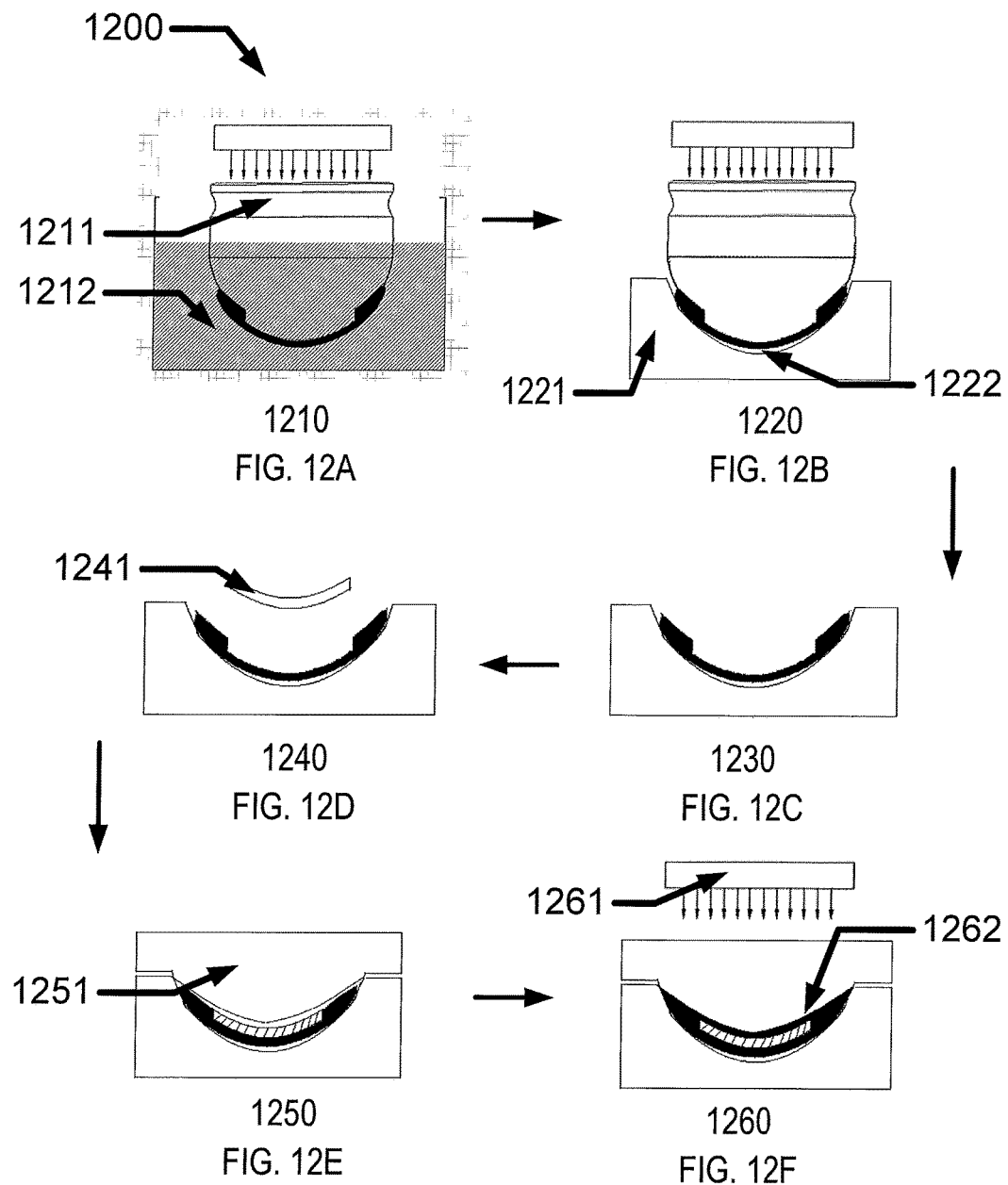

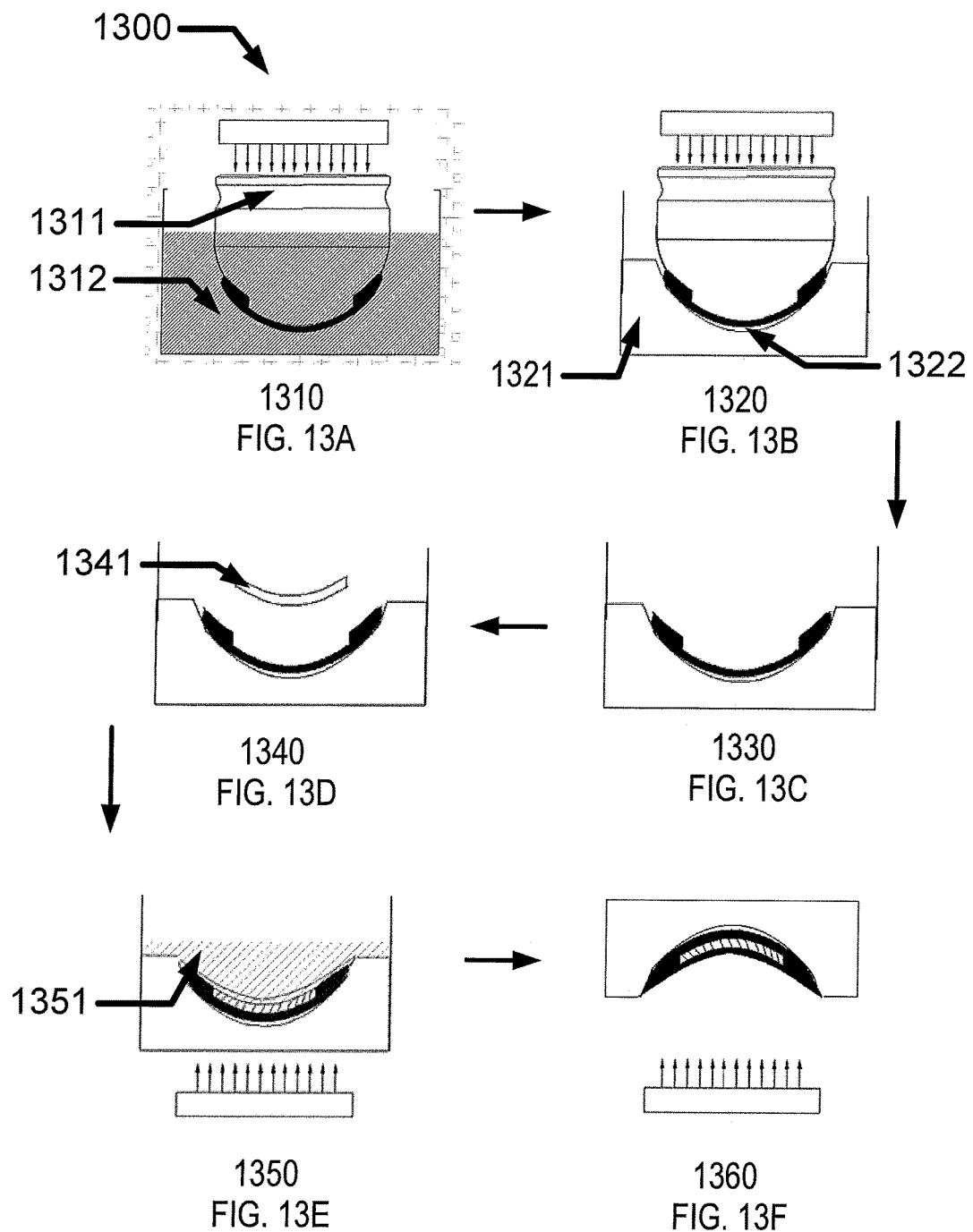

METHODS FOR FORMATION OF AN OPHTHALMIC LENS WITH AN INSERT UTILIZING VOXEL-BASED LITHOGRAPHY TECHNIQUES

FIELD OF USE

The present invention relates to devices, systems, and methods for the fabrication of ophthalmic lenses and, more particularly, to the fabrication of a lens with an embedded insert where at least a portion of the lens may be formed in a freeform manner. Even more particularly, the present invention relates to freeform processing utilizing voxel-based lithography.

BACKGROUND OF THE INVENTION

Traditionally, ophthalmic lenses may be made by cast molding, wherein a monomer material may be deposited in a cavity defined between optical surfaces of opposing mold parts. Multi-part molds used to fashion hydrogels into a useful article, such as an ophthalmic lens, may include, a first mold part with a convex portion that corresponds with a back curve of an ophthalmic lens and a second mold part with a concave portion that corresponds with a front curve of the ophthalmic lens. To prepare a lens using such mold parts, an uncured hydrogel lens formulation may be placed between a plastic disposable front curve mold part and a plastic disposable back curve mold part.

The front curve mold part and the back curve mold part typically may be formed via injection molding techniques, wherein melted plastic may be forced into highly machined steel tooling with at least one surface of optical quality. The front curve and back curve mold parts may be brought together to shape the lens according to desired lens parameters. The lens formulation may be subsequently cured, for example, by exposure to heat and light, thereby forming a lens. Following cure, the mold parts may be separated and the lens may be removed from the mold parts.

Cast molding of ophthalmic lenses has been particularly successful for high volume runs of a limited number of lens sizes and powers. However, the nature of the injection molding processes and equipment may make it difficult to form custom lenses specific to a particular patient's eye or a particular application. Consequently, other techniques have been explored, such as lathing a lens button and stereolithography techniques. However, lathing may require a high modulus lens material, may be time consuming, and may be limited in the scope of the surface available, and stereolithography has not yielded a lens suitable for human use.

Recently, new types of ophthalmic lenses that may comprise inserts have been proposed, wherein the inserts may be incorporated into standard ophthalmic lens materials, such as a hydrogel. Current molding techniques may not be suited for manufacture such exemplary ophthalmic lenses, and the issues associated with lathing and stereolithography may be exacerbated by the addition of an insert. For example, lathing too deeply in an ophthalmic lens surface may damage an encapsulated insert.

Unlike with a standard ophthalmic lens, additional manufacturing steps may be necessary to allow the standard ophthalmic lens material to adhere or encapsulate the insert. With typical molding techniques, the stress from pulling the front curve mold part from the back curve mold part may separate the lens material from the insert. Accordingly, it may be desirable to develop alternative techniques to form ophthalmic lenses with inserts.

SUMMARY OF THE INVENTION

The free form method and respective apparatus capable of performing such manufacturing methods in accordance with the present invention overcome the disadvantages associated with the prior art as briefly described above. Further, the present invention discloses methods for manufacturing an ophthalmic lens with an insert using voxel-based lithography techniques, wherein at least a portion of one surface may be free-formed from a reactive mixture. In some embodiments, an ophthalmic lens precursor may be formed on a substrate with an arcuate optical quality surface via a controllable source of actinic radiation to cure a definable portion of a volume of reactive mixture.

In exemplary embodiments, forming the ophthalmic lens on either a front curve or back curve mold piece may limit the stress placed on the ophthalmic lens with an insert when removed from the free form apparatus. Similarly, in other exemplary embodiments, the free form techniques may be integrated with traditional molding methods, wherein the free form techniques may reduce the pressure required to form the lens between the two mold parts.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 6A-6D illustrates an alternative exemplary embodiment of a processing flow for encapsulating a media insert within a biocompatible polymerized material utilizing freeform methods.

FIGS. 12A-12F illustrate an exemplary embodiment of a process flow for utilizing a forming optic with insert pocket defining features that may be useful in implementing some embodiments of the present invention.

FIGS. 13A-13F illustrate an exemplary method to form an insert containing ophthalmic devices that may be useful in implementing some embodiments of the present invention.

DETAILED DESCRIPTION OF THE INVENTION

Figure 1:
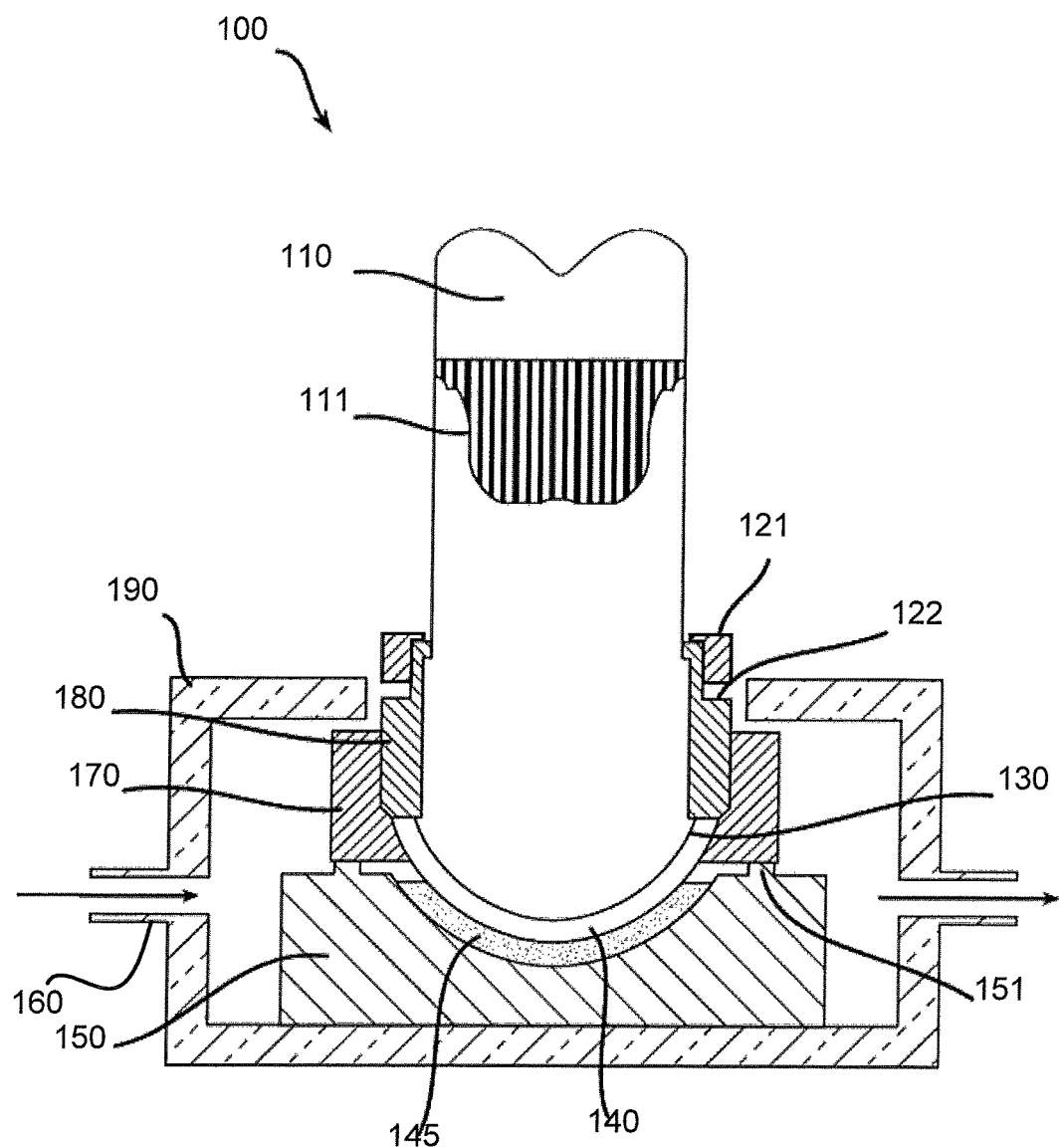
FIG. 1 illustrates an exemplary embodiment of a freeform apparatus that may be used to implement some exemplary embodiments of the present invention.

The present invention provides for methods, devices, and systems for forming a lens with an embedded or partially embedded insert. In the following sections, detailed descriptions of embodiments of the invention will be given. The description of both preferred and alternative embodiments though thorough are exemplary embodiments only, and it may be understood that to those skilled in the art variations, modifications, and alterations may be apparent. It should be therefore understood that the exemplary embodiments do not limit the broadness of the aspects of the underlying invention.

Glossary

In this description and claims directed to the presented invention, various terms may be used for which the following definitions will apply:

Actinic Radiation: as used herein refers to radiation that may be capable of initiating a chemical reaction.

Arcuate: as used herein refers to a curve or bend like a bow.

Beer's Law or Beers-Lambert Law: as used herein refers to $I(x)/I_0 = \exp(-\alpha c x)$, wherein $I(x)$ may be the intensity as a function of distance x from the irradiated surface, $I_0$ may be the incident intensity at the surface, $\alpha$ may be the absorption coefficient of the absorbing component, and c may be the concentration of the absorbing component.

Collimate: as used herein refers to limit the cone angle of radiation, such as light that proceeds as output from an apparatus receiving radiation as an input. In some exemplary embodiments, the cone angle may be limited such that proceeding light rays are parallel. Accordingly, a collimator includes an apparatus that performs this function and collimated describes the effect on radiation.

Distal: as used herein refers to a surface in a position away from the forming optic. For example, the distal end of a lens precursor may be the surface further from the forming optic, in contrast to the surface in contact with the forming optic.

DMD: as used herein refers to a digital micromirror device that may be a bistable spatial light modulator consisting of an array of movable micromirrors functionally mounted over a CMOS SRAM. Each mirror may be independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees (on) or −X degrees (off). For current devices, X may be either 10 degrees or 12 degrees (nominal). Light reflected by the on mirrors then may be passed through a projection lens and onto a screen. Light may be reflected off to create a dark field, and defines the black-level floor for the image. Images are created by gray-scale modulation between on and off levels at a rate fast enough to be integrated by the observer. The DMD (digital micromirror device) may comprise DLP projection systems.

DMD Script: as used herein refers to a control protocol for a spatial light modulator and also to the control signals of any system component, for example, a light source or filter wheel, either of which may include a series of command sequences in time. Use of the acronym DMD may be not meant to limit the use of this term to any one particular type or size of spatial light modulator.

Etafilcon: as used herein refers to an exemplary material that may be used as a reactive mixture and may include approximately 95 percent HEMA (2-hydroxyethyl methacrylate), 1.97 percent MAA (methacrylic acid), 0.78 percent EGDMA (ethyleneglycol dimethacrylate) and 0.10% TMPTMA (trimethylolpropane trimethacrylate)-crosslinker, about 1 percent NORBLOC 7966 (a benzotriazole-type UV blocker) and approximately 1 percent photoinitiator CGI 1700 and Diluent—BAGE (boric acid ester of glycerol) (U.S. Pat. No. 4,495,313) in a 52:48 reactive component:diluent ratio.

Fixing radiation: as used herein refers to actinic radiation sufficient to one or more of: polymerize and crosslink essentially all reactive mixture comprising a lens precursor or lens.

Fluent lens reactive media: as used herein refers to a reactive mixture that may be flowable in either its native form, reacted form, or partially reacted form and may be formed upon further processing into a part of an ophthalmic lens.

Free-form or Free-formed or free form or freeform: as used herein refers to a surface that may be formed by crosslinking of a reactive mixture and may be not shaped according to a cast mold. Gel point: as used herein refers to the point at which a gel or insoluble fraction may be first observed. Gel point may be the extent of conversion at which the liquid polymerization mixture becomes a solid. Gel point may be determined using a soxhlet experiment: Polymer reaction may be stopped at different time points and the resulting polymer may be analyzed to determine the weight fraction of residual insoluble polymer. The data may be extrapolated to the point where no gel may be present, which may be the gel point. The gel point may also be determined by analyzing the viscosity of the reaction mixture during the reaction. The viscosity may be measured using a parallel plate rheometer, with the reaction mixture between the plates. At least one plate should be transparent to radiation at the wavelength used for polymerization. The point at which the viscosity approaches infinity may be the gel point. Gel point occurs at the same degree of conversion for a given polymer system and specified reaction conditions.

Lens or ophthalmic lens: as used herein refers to any ophthalmic device that resides in or on the eye. These devices may provide optical correction or may be cosmetic. For example, the term lens may refer to a contact lens, intraocular lens, overlay lens, ocular insert, optical insert or other similar device through which vision may be corrected or modified, or through which eye physiology may be cosmetically enhanced (e.g. iris color) without impeding vision. In some exemplary embodiments, the preferred lenses of the invention are soft contact lenses are made from silicone elastomers or hydrogels, which include but are not limited to silicone hydrogels, and fluorohydrogels.

Lens precursor: as used herein refers to a composite object consisting of a lens precursor form and a fluent lens reactive media in contact with the lens precursor form. For example, in some exemplary embodiments, fluent lens reactive media may be formed in the course of producing a lens precursor form within a volume of reactive mixture. Separating the lens precursor form and adhered fluent lens reactive media from the volume of reactive mixture used to produce the lens precursor form can generate a lens precursor. Additionally, a lens precursor may be converted to a different entity by either the removal of significant amounts of fluent lens reactive mixture or the conversion of a significant amount of fluent lens reactive media into non-fluent incorporated material.

Lens precursor form: as used herein refers to a non-fluent object with at least one optical quality surface that may be consistent with being incorporated upon further processing into an ophthalmic lens.

Lens-forming mixture or reactive mixture or reactive monomer mixture (RMM): as used herein refers to a monomer or prepolymer material that may be cured and cross-linked or cross-linked to form an ophthalmic lens. Various embodiments may include lens-forming mixtures with one or more additives, for example, UV blockers, tints, photoinitiators or catalysts, and other additives one might desire in an ophthalmic lenses such as, contact or intraocular lenses.

Media insert: as used herein refers to an encapsulated insert that will be included in an energized ophthalmic device. The energization elements and circuitry may be embedded in the media insert. The media insert defines the primary purpose of the energized ophthalmic device. For example, in exemplary embodiments where the energized ophthalmic device allows the user to adjust the optic power, the media insert may include energization elements that control a liquid meniscus portion in the optic zone. Alternatively, a media insert may be annular so that the optic zone may be void of material. In such exemplary embodiments, the energized function of the lens may not be optic quality but may be, for example, monitoring glucose or administering medicine.

Mold: as used herein refers to a rigid or semi-rigid object that may be used to form lenses from uncured formulations. Some preferred molds include two mold parts forming a front curve mold part and a back curve mold part.

Radiation-absorbing component: as used herein refers to a radiation-absorbing component that may be combined in a reactive monomer mixture formulation and that may absorb radiation in a specific wavelength range.

Release from a mold: as used herein refers to a lens that becomes either completely separated from the mold, or may be only loosely attached so that it may be removed with mild agitation or pushed off with a swab.

Rigid insert or insert: as used herein refers to an insert that maintains a predefined topography. In some exemplary embodiments, when included in an ophthalmic lens, the rigid insert may contribute to the functionality and/or modulus of the lens. For example, varying topography of or densities within the rigid insert may define zones, which may correct vision in users with astigmatism. The rigid insert may be sufficiently flexible to allow for placement and removal of the ophthalmic lens on and off the eye.

Voxel-based lithographic lens precursor: as used herein refers to a lens precursor where the lens precursor form has been formed by use of a voxel-based lithographic technique.

Substrate as used herein means a physical entity upon which other entities are placed or formed.

Transient lens reactive media: as used herein refers to a reactive mixture that may remain in fluent or non-fluent form on a lens precursor form. However, transient lens reactive media may be significantly removed by one or more of: cleaning, solvating and hydration steps before it becomes incorporated into an ophthalmic lens. Therefore, for clarity, the combination of a lens precursor form and the transient lens reactive mixture does not constitute a lens precursor.

Voxel or Actinic Radiation voxel: as used herein refers to a volume element, representing a value on a regular grid in three-dimensional space. A voxel may be viewed as a three-dimensional pixel; however, wherein a pixel represents two-dimensional image data a voxel includes a third dimension. In addition, wherein voxels are frequently used in the visualization and analysis of medical and scientific data, in the present invention, a voxel may be used to define the boundaries of an amount of actinic radiation reaching a particular volume of reactive mixture, thereby controlling the rate of crosslinking or polymerization of that specific volume of reactive mixture. By way of example, voxels are considered in the present invention as existing in a single layer conformal to a two-dimensional mold surface wherein the actinic radiation may be directed normal to the two-dimensional surface and in a common axial dimension of each voxel. As an example, specific volume of reactive mixture may be cross-linked or polymerized according to 768×768 voxels.

Voxel-based lens precursor: as used herein refers to a lens precursor where the lens precursor form has been formed by use of a voxel-based lithographic technique.

Xgel: as used herein refers to the extent of chemical conversion of a crosslinkable reactive mixture at which the gel fraction becomes greater than zero.

Apparatus

Voxel-Based Lithography (Freeform) Optical Apparatus

A voxel-based lithography optical apparatus may be a component that uses actinic radiation to create lens precursor forms and lens precursors. In the present invention, the apparatus may take highly uniform intensity radiation and may direct the radiation onto the surface of a forming optic at numerous discrete points across the forming optic surface, essentially on a voxel by voxel basis. This direction may allow this component to control the degree of reaction that may occur in a reactive mixture along the light path of a particular voxel location. Such degrees of reaction may determine the volume of reacted material in that specific location, and, accordingly, the shape of a lens precursor formed thereon.

Proceeding now to FIG. 1, the components of a voxel-based lithograph optical forming apparatus 100 may impinge the beam of radiation on the ultimate target area of the reactive mixture. In some embodiments, this radiation or light may be focused onto a normal orientation with respect to angles of the surface 140 of a forming optic 130 or mandrel. In some exemplary embodiments of the forming apparatus 100, the radiation or light may impinge in a roughly vertical manner to the surface 140 of the forming optic 130. The forming optic 130 may be held in place via a retaining ring 121 or other fastening device, which may maintain the correct orientation of the optical system relative to the forming optic 130. Other paths that light may take on a voxel by voxel basis across the optic surface 140 may be apparent and are within the scope of the inventive art.

In exemplary embodiments where the relative orientation of a reservoir 150, comprising the reactive monomer mixture, and forming optic 130 to the light beam may be significant, additional mechanisms for their interlocked location may be included, for example, a forming optic retaining member 170 with associated interlocking features 180 and 122. The alignment between the retaining member 170 and interlocking features 180 and 122 may also provide for position control of the centering of the reservoir 150 to the forming optic surface 140. The position control may be enhanced in some exemplary embodiments with a spacing ring 151, which may also control the volume of reactive monomer mixture added to the reservoir 150.

In some exemplary embodiments, the presence of oxygen may modify the photochemistry of the monomers and act as a scavenger of photogenerated free radicals. Accordingly, a means to control ambient gasses surrounding the reactive monomer mixture 145 may be necessary to allow for uniform reactions of the reactive monomer mixture 145. For example, in some exemplary embodiments, the reservoir 150 may be enclosed in a containment vessel 190 that may exclude ambient gasses, such as oxygen. The exclusion may be enhanced by flowing an inert gas, such as nitrogen, through a tube or channel 160 included in the containment vessel 190. In other exemplary embodiments, the oxygen level may be managed by controlling the dilution of oxygen in the gas flowed through the channel 160 included in the containment vessel 190.

The reservoir 150 may be filled with a sufficient volume of reactive monomer mixture 145 that may allow for proper formation of an ophthalmic lens. In some exemplary embodiments, this filling may occur before the forming optic 130 may be positioned relative to the reservoir 150. In other exemplary embodiments, the forming optic 130 and the reservoir 150 may be placed inside the containment vessel 190 and subjected to the purging with a gas flow through the channel 160. Alternatively, the reactive monomer mixture 145 may be degassed or filtered prior to placement within the reservoir 150. Thereafter, a volume of the monomer reactive mixture 145 may be quantitatively filled into the reservoir 150 where the reactive monomer mixture 145 may interact with at least a portion of a surface 140 of the forming optic 130.

There may be numerous means to transfer the reactive monomer mixture 145 to the reservoir 150, including hand filling, quantitative fluid transfer by automatic means, for example, an automatic feedback control system, or filling until a level detector measures the appropriate level of reactive mixture 145 in the reservoir 150. Other filling techniques may be utilized and are within the scope of invention.

In exemplary embodiments where the level of oxygen may be critical to the photoprocessing steps, it may be apparent that oxygen may be present as a dissolved species in the reactive monomer mixture 145. In such embodiments, means to establish the oxygen concentration in the reactive monomer mixture 145 may be required. Some such embodiments to accomplish this function may include allowing the mixture to dwell in the gaseous environment through which the purge gas 160 may be flowing. Alternative embodiments may involve vacuum purging of the dissolved gasses in a supply of the reactive monomer mixture and reconstituting a desired amount of oxygen during a dispensing of the mixture through membrane exchange of gas with the liquid to be dispensed.

Within the scope of the present invention, it may be apparent that any means to establish the needed dissolved gas at an appropriate concentration may be acceptable. Furthermore, in a more general sense, other materials may act as appropriate inhibitors in the presence or absence of the dissolved oxygen. From an even more general perspective, exemplary embodiments that include an apparatus to establish and maintain an appropriate level of inhibitor are anticipated in the scope of the invention.

In some exemplary embodiments, actinic radiation 110 may be controlled and varied across a spatial grid 111, wherein the actinic radiation 110 may gel portions of the reactive monomer mixture 145 into a specific three-dimensional shape. In some such embodiments, the result of exposing the RMM 145 to the actinic radiation 110 may be a lens precursor, which may have both a gelled region and a fluent reactive media region. The fluent reactive media may be important to forming a quality optical surface upon the gelled surface but may also function in the process of adhering portions of the lens precursor to other surfaces, including, for example, surfaces of an insert or other substrates.

Some exemplary embodiments of free form apparatuses 100 may allow other methods of free form production where at least one surface may be not formed under the action of a molding process. For example, various methods of spatially modifying light intensity may include DMD devices and spatial light modifiers. Alternatively, voxel-based lithography may be used to form biocompatible polymerized material portions of the ophthalmic lens onto which or into which inserts may be placed.

Exemplary Forming Optic Apparatus

Figure 2:
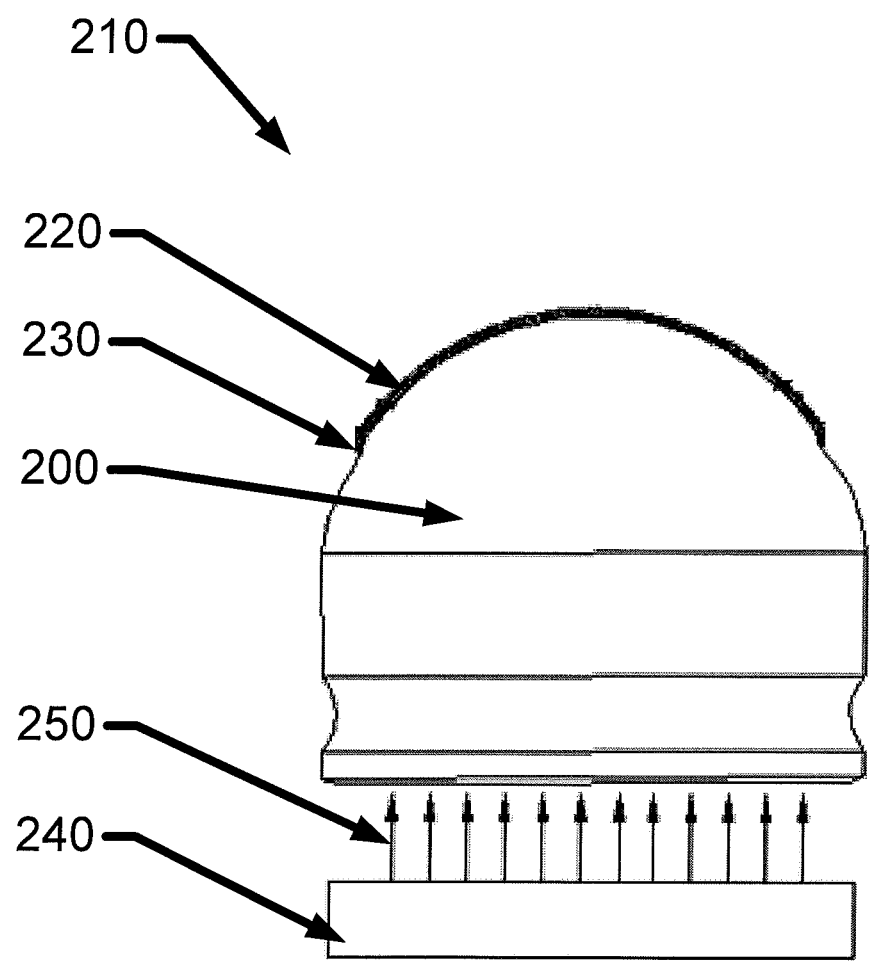
FIG. 2 illustrates an embodiment of a free form lens or a free form lens precursor upon a male mold mandrel that may be used to implement some exemplary embodiments of the present invention.

Referring to FIG. 2, a detailed example of a forming optic 210 is illustrated. The forming optic 210 may be made from numerous optically transparent materials, wherein a light beam 250, such as actinic radiation, may pass through the forming optic 210 and impinge on the surface of the forming optic 210. The light beams 250 from a controlled radiation source 240 that may be part of the forming optic 210 may create a gelled ophthalmic lens material 220, which may be shaped by an optical apparatus 210 in combination with the light 250 from the controlled radiation source 240. In some exemplary embodiments, for example, the forming optic 210 may comprise fused quartz or transparent polymeric materials. The surface of the forming optic 210 may be formed or may be machined to include features that may be useful in forming the ophthalmic lens and/or aligning the insert within the ophthalmic lens. For example, an edge 230 may be useful in shaping the resulting lens precursor edge into appropriately shaped features for an ophthalmic lens. As another example, the forming optic 210 may comprise fiducial or scribe marks for orientation and inside-out registration.

Lenses Incorporating Inserts and Examples of Insert Types with Exemplary Materials for Biocompatible Polymerized Material One objective of the art described herein may include the formation of ophthalmic lenses that may include embedded inserts within their body. The lenses may have a soft biocompatible region that may encapsulate or surround an insert. In some exemplary embodiments, a preferred lens material may include a silicone-containing component. A detailed description is given below.

A silicone-containing component may be one that contains at least one [—Si—O—] unit in a monomer, macromer, or prepolymer. Preferably, the total Si and attached O may be present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some exemplary embodiments, the soft biocompatible polymerized portion or insert-encapsulating layer that surrounds the insert may be comprised of standard hydrogel ophthalmic lens formulations. Exemplary materials with characteristics that may provide an acceptable match to numerous insert materials may include, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other materials other than those discussed may also form an acceptable enclosure or partial enclosure of the sealed and encapsulated inserts and should be considered consistent and included within the scope of the claims.

Suitable silicone-containing components include compounds of Formula I where $R^1$ may be

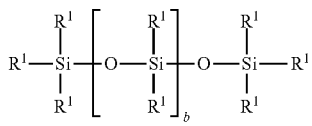

independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof; where b=0 to 500, where it may be understood that when b may be other than 0, b may be a distribution having a mode equal to a stated value; wherein at least one $R^1$ comprises a monovalent reactive group, and in some exemplary embodiments between one and 3 $R^1$ comprise monovalent reactive groups.

As used herein, monovalent reactive groups may be groups that can undergo free radical and/or cationic polymerization. Non-limiting examples of free radical reactive groups include (meth)acrylates, styryls, vinyls, vinyl ethers, C1-6 alkyl(meth)acrylates, (meth)acrylamides, C1-6alkyl (meth)acrylamides, N-vinyllactams, N-vinylamides, C2-12 alkenyls, C2-12 alkenylphenyls, C2-12 alkenylnaphthyls, C2-6 alkenylphenyl C1-6 alkyls, O-vinylcarbamates and O-vinylcarbonates. Non-limiting examples of cationic reactive groups include vinyl ethers or epoxide groups and mixtures thereof. In one exemplary embodiment the free radical reactive groups comprises (meth)acrylate, acryloxy, (meth)acrylamide, and mixtures thereof.

Suitable monovalent alkyl and aryl groups include unsubstituted monovalent C1 to C16 alkyl groups, C6-C14 aryl groups, such as substituted and unsubstituted methyl, ethyl, propyl, butyl, 2-hydroxypropyl, propoxypropyl, polyethyleneoxypropyl, combinations thereof and the like.

In some exemplary embodiments, b may be zero, one $R^1$ may be a monovalent reactive group, and at least 3 $R^1$ may be selected from monovalent alkyl groups having one to 16 carbon atoms, and in other embodiments from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In other exemplary embodiments, b may be 2 to 20, 3 to 15 or in some embodiments 3 to 10; at least one terminal $R^1$ may comprise a monovalent reactive group and the remaining $R^1$ are selected from monovalent alkyl groups having 1 to 16 carbon atoms, and in another exemplary embodiment from monovalent alkyl groups having 1 to 6 carbon atoms. In yet another exemplary embodiment, b may be 3 to 15, one terminal $R^1$ may comprise a monovalent reactive group, the other terminal $R^1$ may comprise a monovalent alkyl group having 1 to 6 carbon atoms, and the remaining $R^1$ may comprise monovalent alkyl group having 1 to 3 carbon atoms. Non-limiting examples of silicone components of this exemplary embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In other exemplary embodiments, b may be 5 to 400 or from 10 to 300, both terminal $R^1$ may comprise monovalent reactive groups and the remaining $R^1$ may be independently selected from monovalent alkyl groups having 1 to 18 carbon atoms, which may have ether linkages between carbon atoms and may further comprise halogen.

In some exemplary embodiments, where a silicone hydrogel lens may be desired, the lens of the present invention will be made from a reactive mixture comprising at least about 20 and preferably between about 20 and 70% wt silicone containing components based on total weight of reactive monomer components from which the polymer may be made.

In other exemplary embodiments, one to four $R^1$ may comprise a vinyl carbonate or carbamate of the formula:

Formula II

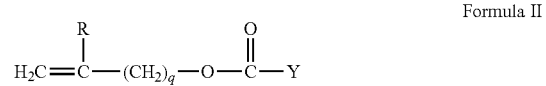

wherein: Y denotes O—, S— or NH—; R denotes, hydrogen or methyl; d may be 1, 2, 3 or 4; and q may be 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris (trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and where biomedical devices with modulus below about 200 are desired, only one R1 shall comprise a monovalent reactive group and no more than two of the remaining R1 groups will comprise monovalent siloxane groups.

Another class of silicone-containing components includes polyurethane macromers of the following formulae:

(*D*A*D*G)*a*D*D*E1;

E(*D*G*D*A)*a*D*G*D*E1 or;

E(*D*A*D*G)*a*D*A*D*E1        Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a may be at least 1;

A denotes a divalent polymeric radical of formula:

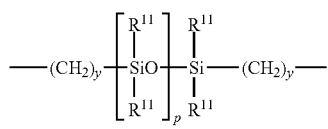

Formula VII $R^{11}$ independently denotes an alkyl or fluoro-substituted alkyl group having 1 to 10 carbon atoms, which may contain ether linkages between carbon atoms; y may be at least 1; and p provides a moiety weight of 400 to 10,000; each of E and E1 independently denotes a polymerizable unsaturated organic radical represented by formula:

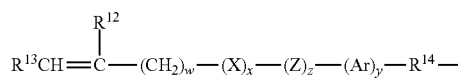

Formula VIII wherein: $R^{12}$ may be hydrogen or methyl; $R^{13}$ may be hydrogen, an alkyl radical having 1 to 6 carbon atoms, or a —CO—Y—$R^{15}$ radical wherein Y may be —O—, Y—S— or —NH—; $R^{14}$ may be a divalent radical having 1 to 12 carbon atoms; X denotes —CO— or —OCO—; Z denotes —O— or —NH—; Ar denotes an aromatic radical having 6 to 30 carbon atoms; w may be 0 to 6; x may be 0 or 1; y may be 0 or 1; and z may be 0 or 1.

A preferred silicone-containing component may be a polyurethane macromer represented by the following formula:

Formula IX (the full structure may be understood by joining corresponding asterisk regions, * to *,  to )

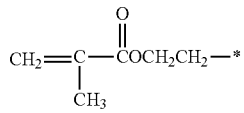

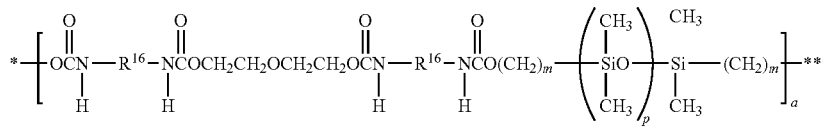

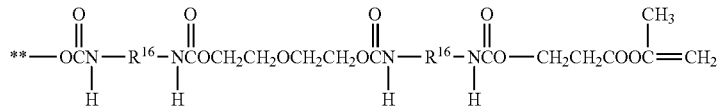

wherein R16 may be a diradical of a diisocyanate after removal of the isocyanate group, such as the diradical of isophorone diisocyanate. Another suitable silicone-containing macromer may be a compound of formula X (in which x+y may be a number in the range of 10 to 30) formed by the reaction of fluoroether, hydroxy-terminated polydimethylsiloxane, isophorone diisocyanate and isocyanatoethylmethacrylate. Formula X (the full structure may be understood by joining corresponding asterisk regions, * to *)

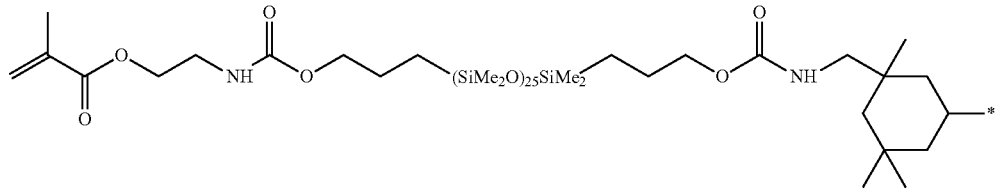

-continued

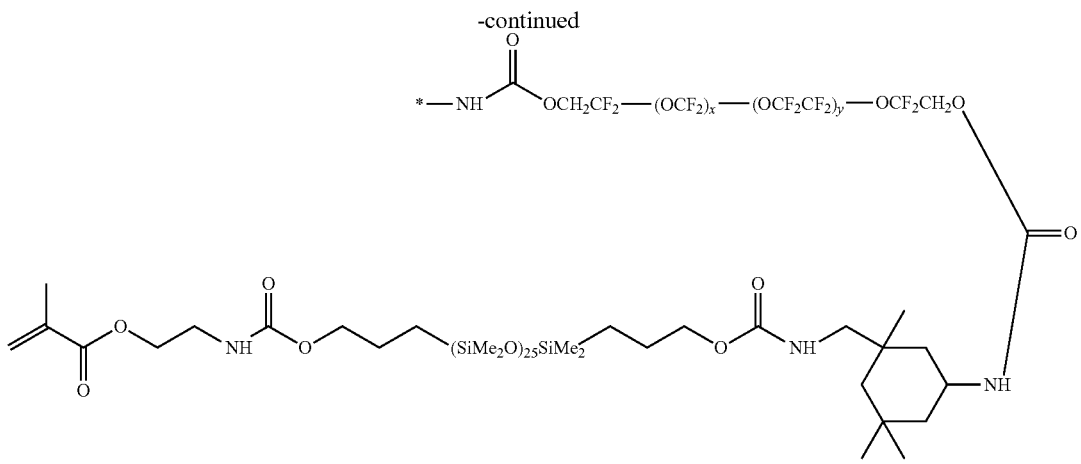

Other silicone-containing components suitable for use in the present invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkages and cross-linkable monomers containing polyether and polysiloxanyl groups. Any of the foregoing polysiloxanes can also be used as the silicone-containing component in the present invention.

Figures 3A, 3B:
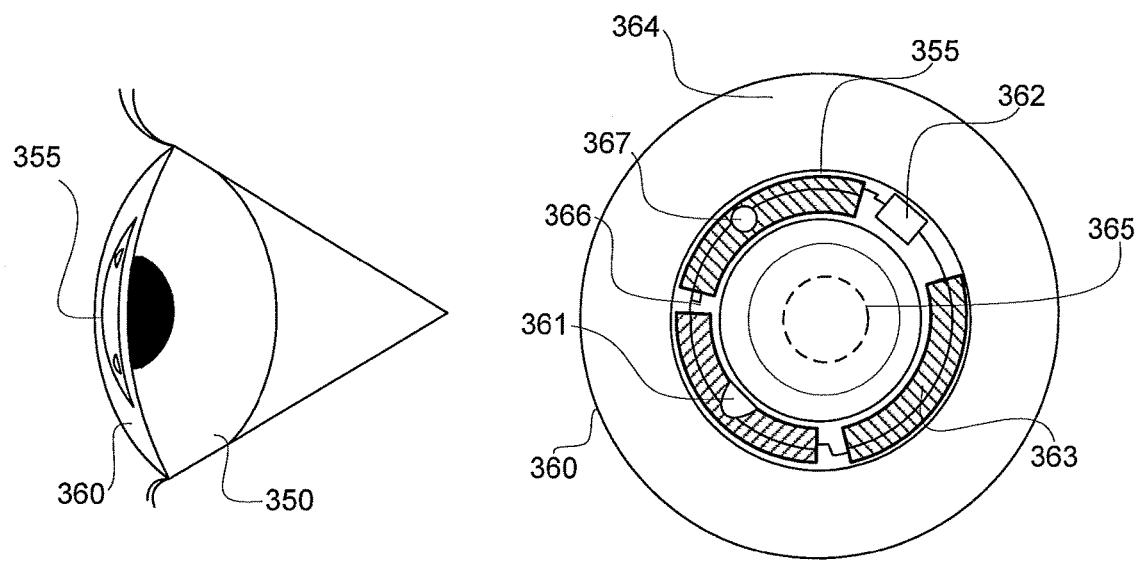
FIG. 3A illustrates a cross-sectional view of an exemplary embodiment of an energizable ophthalmic lens on an eye.
FIG. 3B illustrates a front view of an exemplary embodiment of an energizable ophthalmic lens.
Figure 4:
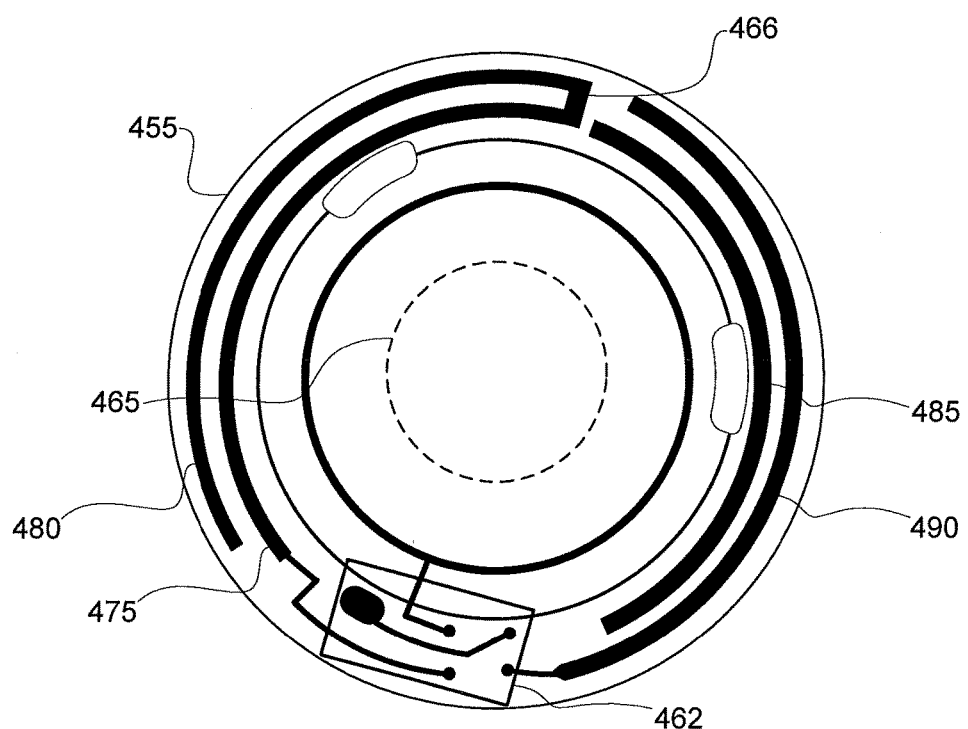
FIG. 4 illustrates a front view of an exemplary embodiment of a media insert, wherein an energizable ophthalmic lens may comprise the exemplary media insert.

Referring now to FIGS. 3A, 3B, and 4, an exemplary embodiment of a media insert 355 for an energized ophthalmic device 360 on an eye 350 in side view is illustrated in FIG. 3A, a front view of a corresponding energized ophthalmic device 360 is illustrated in FIG. 3B, and a front view of the media insert 455 is illustrated in FIG. 4. The media insert 355 of FIGS. 3A and 3B may comprise an optic zone 365 that may or may not provide a second functionality, including, for example, vision correction. Where the energized function of the ophthalmic device may be unrelated to vision, the optic zone 365 of the media insert 355 may be void of material In some exemplary embodiments, the media insert 355 may include a portion not in the optic zone 365 comprising a substrate incorporated with energizing elements, such as a power source 363, and electronic components, such as a processor 362. In some exemplary embodiments, the power source 363, including, for example, a battery, and the processor 362, including, for example, a semiconductor die, may be attached to the substrate. In some such aspects, conductive traces 366 may electrically interconnect the electronic components 362 and 361 and the energization elements or power source 363.

In some exemplary embodiments, the media insert 355 may further comprise a receiver 367, which may wirelessly detect, transmit, and receive interface data to and from an external device. The receiver 367 may be in electrical communication, such as through the conductive traces 366, with the processor 362 and the power source 363.

In some exemplary embodiments, the processor 362 may be programmed to establish the parameters of the functionality of the ophthalmic lens 360. For example, where the ophthalmic lens 360 comprises a variable optic portion in the optic zone 365, the processor 362 may be programmed to set the energized optical power. Such an exemplary embodiment may allow for mass production of media inserts that have the same composition but include uniquely programmed processors.

The processor 362 may be programmed before the encapsulation of the electrical components 361-363, 366, 367 within the media insert 355. Alternatively, the processor 362 may be programmed wirelessly after encapsulation. Wireless programming may allow for customization after the manufacturing process, for example, through a programming apparatus in a doctor's office, a store, or a home. In some exemplary embodiments, the external device may be capable of programming an ophthalmic lens 360.

For illustrative purposes, the exemplary media insert 355 may be shown in an annular form or configuration, which may not include a portion in the optic zone 365, although several possibilities may exist for the mechanical implementation of a functional insert. However, where a functionality of the media insert 355 may be related to vision, the media insert 355 may include an energizable element within the optic zone 365. For example, the media insert 355 may comprise a variable optic portion, wherein the media insert 355 may provide multiple powers of vision correction based on different energization levels. It is important to note that the energizable element may include spherical powers, cylindrical powers, and/or correction for higher order aberration. Also, it is important to note that the lens may be circular, non-circular, planar, non-planar and/or any combination thereof.

For example, a liquid meniscus lens may promote an optic with variable focus capabilities as is explained in more detail subsequently.

In some exemplary embodiments, the external device, set forth above, may comprise a control mechanism for the variable optic portion, or other adjustable functionalities. For example, the variable optic portion may be adjusted based on the viewing distance, such as for users with presbyopia. In some exemplary embodiments, the variable optic portion may comprise a liquid meniscus, wherein two different immiscible liquids may be layered. The liquid meniscus may change shape when energized, allowing the liquid meniscus to provide an energized optic power and a nonenergized optic power. Similarly, in other exemplary embodiments, the variable optic portion may comprise a liquid crystal, wherein the alignment within the liquid crystal may be altered through energization, allowing for multiple optic powers.

In still further exemplary embodiments, not shown, the insert may not comprise energization elements. In some such aspects, the insert may provide a passive function for the ophthalmic lens. For example, a rigid insert may comprise polarization features, passive biomarker indicators, or passive cosmetic features, such as iris coloration.

The media insert 355 may be fully encapsulated to protect and contain the energization elements 363, traces 366, and electronic components 361, 362, 367. In some exemplary embodiments, the encapsulating material may be semi-permeable, for example, to prevent specific substances, such as water, from entering the media insert 355 and to allow specific substances, such as ambient gasses or the byproducts of reactions within energization elements, to penetrate or escape from the media insert 355.

In some exemplary embodiments, the rigid insert (not shown) or media insert 355 may be included in an ophthalmic device 360, which may comprise a polymeric biocompatible material. The ophthalmic device 360 may include a rigid center, soft skirt design wherein a central rigid optical element comprises the media insert 355. In some specific embodiments, the media insert 355 may be in direct contact with the atmosphere and/or the corneal surface on respective anterior and posterior surfaces, or alternatively, the media insert 355 may be encapsulated in the ophthalmic device 360. The periphery 364 of the ophthalmic device 360 may be a soft biocompatible material, including, for example, a polymerized reactive monomer mixture, such as a hydrogel material.

Referring now to FIG. 4, an exemplary embodiment of an insert 455 with both a non-optic zone region and an optic zone region 465 is illustrated in a top down view. Some such embodiments may include elements that support battery-type energization elements, such as electrodes 475, 480, 485, 490 upon which the battery chemicals may be placed and encapsulated.

For example, a series combination of two alkaline cell pairs may be included around the periphery and electrically connected through an interconnecting element 466. These elements may be located in the non-optic zone region since the materials may absorb or scatter light. The non-optic zone region may also have electronic components, including circuit elements, which may be encapsulated within the insert body and connected to the energization elements 462. There may be other connections and electrodes that are made to the circuit element in various exemplary embodiments.

Free Form Methods of Producing Insert-Containing Ophthalmic Lenses

Referring to FIGS. 5A-5F, exemplary processing steps to form an ophthalmic lens containing an insert by use of aspects of voxel-based lithography free form methods are illustrated. In this exemplary embodiment, a specialized well 511 may be formed at step 510. The specialized well 511 may be formed through a variety of processes, including, thermoforming, molding, or three-dimensional printing. The specialized well 511 may include protruding support features 512, which may allow for the holding and placement of an insert piece that may be encapsulated within the ophthalmic lens. Other exemplary embodiments may include additional features 512 across the mold surface, but at least three protrusions 512, two of which are illustrated, may be useful to establish a hold position for the insert piece.

At step 520, the insert piece may be placed upon the protruding support features 512. In some exemplary embodiments, the support features 512 may be relatively sharp features that are designed to mate with features that are preformed into the insert body to allow for a preferred orientation. When the piece is in its designated location, the reservoir may be filled with reactive media as shown at step 530. In some alternative exemplary embodiments, mating may not be necessary, and the support features 512 may function as an alignment mechanism, wherein the support features 512 may allow for precise centering of the insert 521 relative to the forming optic 541. For example, support features 512 may contact and secure the edge perimeter of the insert 521 within the specialized well 511. As another example, support features (not shown) may be integrated with the forming optic.

In alternative exemplary embodiments, the reservoir may already contain reactive media prior to the placement of the insert piece or the insert piece and support features may be lowered into the reservoir. At step 530, by one of the various mentioned methods, the insert may be located at a determined position in a bath of reactive monomer mixture that may be used with the techniques of voxel-based lithography to encapsulate the insert.

Figure 5A:
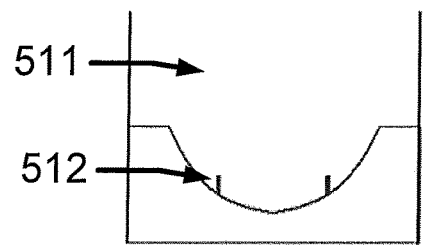
FIGS. 5A-5F illustrate an exemplary embodiment of a processing flow for encapsulating a media insert within a biocompatible polymerized material utilizing freeform methods.
Figure 5B:
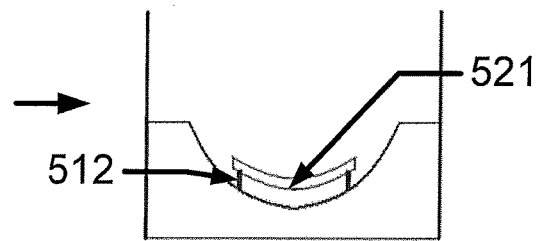
Figure 5D:
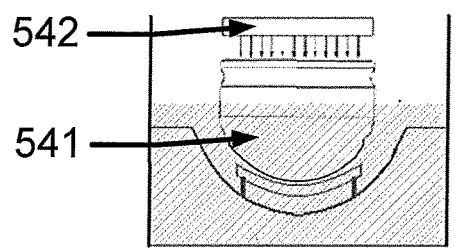
Figure 5C:
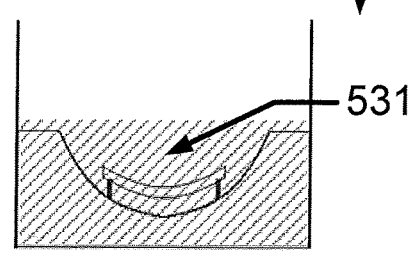
Figure 5E:
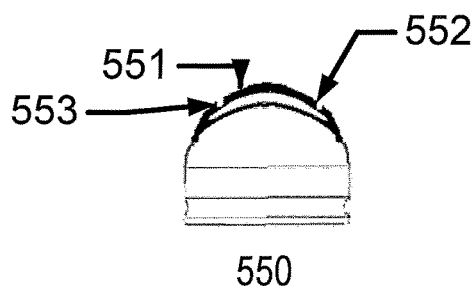
Figure 5F:
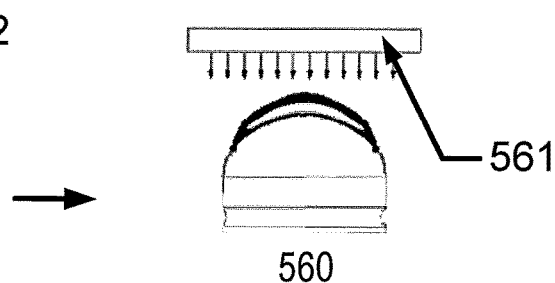

Referring to FIG. 5D and step 540, a forming optic 541 may be positioned into a defined location in close proximity to the insert piece. When light from an optic system 542 may be shown through the forming optic, the reactive monomer may be polymerized. With the diverse capabilities that a voxel-based lithography system allows, the thickness of the polymerized layers may be precisely controlled. In some exemplary embodiments, the entire region between the forming optic and the insert may be polymerized. In many exemplary embodiments, regions around the periphery of the insert may also be subject to controlled polymerization. After the polymerization of the region between the forming optic and the insert piece may be achieved, the insert piece is attached to the forming optic.

Since it may be significant to release the polymerized material from the forming optic at a later step, there may be numerous preparation steps that are performed upon the forming optic surface before it may be lowered into the reactive monomer mixture, such as the coating of the surface with release agents that may facilitate release of the polymerized material by thermal, photoactive, or chemical/solvation based action. For example, a water-soluble adhesive may be applied to the forming optic before it may be used to polymerize the reactive monomer mixture. At a later hydration step, the adhered lens product may be released due to the solvation of the adhesive in a water- or steam-based environment. It is important to note that any suitable material may be utilized.

The light exposure of the optic system 542 may continue to irradiate reactive monomer mixture after the monomer between the forming optic surface and the insert may be polymerized. In the region of the insert, however, the light may cross through the insert itself. In some regions, as for example in FIG. 3B, in the optic zone 365, the light may readily pass through the insert with small amounts of perturbation. The effect of the insert in these regions may be repeatable from one insert sample to a next sample, wherein the control systems for the optic system may be programmed to adjust for the effects. For example, the polymerization settings may be adjusted for the entire surface to overcome the perturbations caused by the insert. Alternatively, the polymerization settings may be adjusted for the specific region where light may pass through the insert. In other regions, as for example in the region of electronic components 361, 362, 367 in FIG. 3, the light may be completely blocked. Therefore, over certain non-transparent regions of the insert surface there may be minimal polymerization. As well, the voxel-based lithography system may be programmed not to expose certain regions of the insert surface, and these too may have minimal polymerization.

Referring to step 550, the forming optic and the attached and at least partially encapsulated insert may be removed from the reactive monomer mixture and placed such that the distal region of the combined forming optic, insert, and polymerized material may be pointed upward such that gravity may draw fluent media along the surface of the polymerized material downward. This step and method may be commonly employed in the techniques of voxel-based lithography for the production of lens precursors.

In some cases, the amount of fluent material upon the surface 551 may be sufficient to flow into various voids 552, if any, in the surface. The voids may be voids in the polymerized features due to the blocking of light by components in the insert. In other regions 553, there may be voids intentionally formed by the programming of light to allow, for example, the support features to be detached from the insert in select regions. In some cases, the amount of material required to fill in the voids 552, 553 on the surface of the lens may exceed the natural amount of fluent material retained during the removal of the lens from the reactive monomer mixture. In some such embodiments, supplemental reactive monomer mixture may be applied by various techniques including spraying, dripping or flowing, and printing techniques to the void areas.

After the surface has been allowed to achieve a desired shape with the flow of fluent material and after any supplemental material may be added to the surface, the resulting surface and, in some embodiments, the entire formed biocompatible polymerized material may be subjected to fixing radiation to polymerize any incompletely polymerized material. This fixing step may be performed as shown in step 560 with radiation from source 561. An ophthalmic lens with an encapsulated insert may result when the resulting product may be removed from the forming optic.

Referring to FIGS. 6A-6D, an alternative exemplary embodiment of a process flow for forming an ophthalmic lens with an insert 622 is illustrated. At step 610, a forming optic 611 may be located within a reservoir 612 containing reactive monomer mixture. Through use of the freeform processing, a resulting product 621 may be created out of polymerized monomer mixture. The product 621 may contain a pocket 623 into which an insert 622 may be placed. In some exemplary embodiments, after removal from the freeform reservoir 612, the forming optic 611 and product 621 may have fluent reactive media placed upon its surface. There may also be remaining fluent lens reactive media on the product at this time. At step 620, the insert 622 may be moved into contact with the pocket 623.

In some exemplary embodiments, at step 630, the combined insert 622 and biocompatible polymerized material product 621 may have a layer of reactive monomer mixture applied on their surfaces 631. The mixture may be applied by various techniques including spraying, dripping, flowing, or printing techniques. A dwelling period to allow the applied mixture to flow across the surface 631 and assume a uniform film may occur in some exemplary embodiments.

At step 640, an exposure to fixing radiation, such as by an illuminating source 641, may occur to fully polymerize the unreacted and partially reacted monomer entities present upon the forming optic 611. In some exemplary embodiments, irradiation may occur both from the top side as shown and also through the body of the forming optic 611. In some exemplary embodiments, fluent lens reactive media 642 may be flowed over the surface 631.

Figure 7:
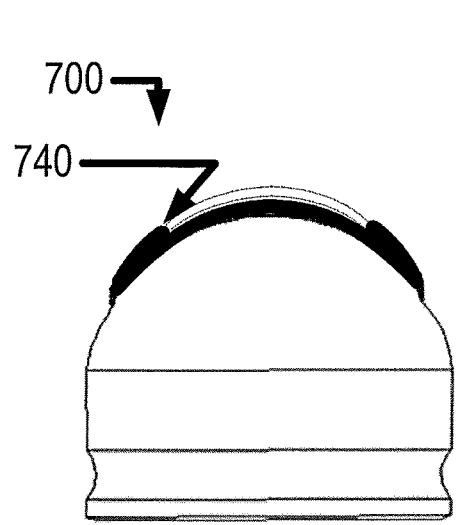
FIG. 7 illustrates an exemplary embodiment of a lens with insert, wherein the insert may be captured by features produced on a freeform-processed biocompatible polymerized material that may be formed in accordance with some embodiments of the present invention.

Referring to FIG. 7, an alternative exemplary embodiment of a lens product is depicted. The product may result, for example, by starting at 610 in the process flow depicted in FIGS. 6A-6D and resulting at 620. If after the dwell period fixing radiation may be exposed both to the top of the lens and through the forming optic, a lens product 700 may result where the lens insert may be captured on its sides 740 and across its bottom surface across the biocompatible polymerized material.

Figure 8:
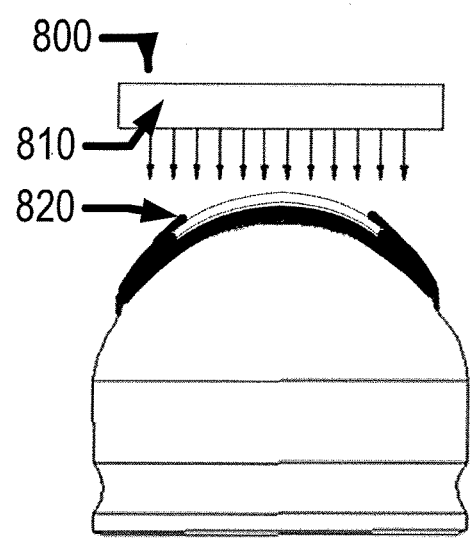
FIG. 8 illustrates exemplary additional processing of the device illustrated in FIG. 7, where additional capturing features are added upon the device.

Referring to FIG. 8, another variation of the process flow 800 shown in FIGS. 6A-6D may be depicted. In some such variations, at 630, the added reactive monomer may be placed around the edge 820 of the insert. Thereafter, when fixing radiation may be exposed to the lens from an optic device 810, a resulting partially encapsulated product may be derived.

Figure 9:
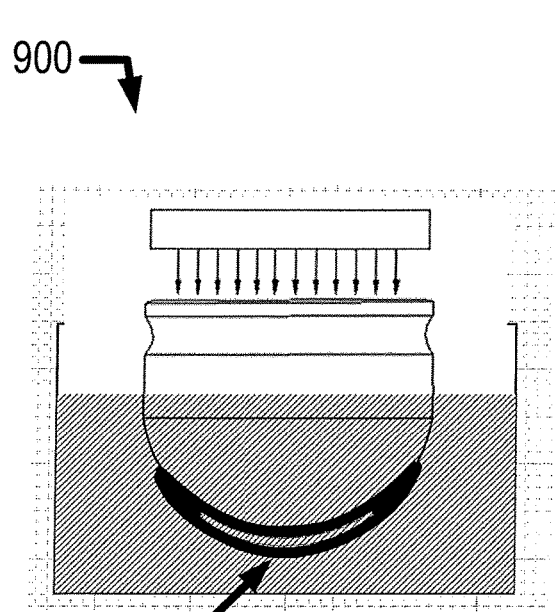
FIG. 9 illustrates an exemplary embodiment of an apparatus for utilizing freeform based processing to encapsulate an insert that has been placed on a biocompatible polymerized material.

Referring to FIG. 9, a still further variation 900 in the processing flow may be illustrated. In some such variations, the result at 630, depicted in FIGS. 6A-6D, may be reintroduced into the reservoir containing reactive monomer mixture. Additional irradiation through the forming optic may result in a deposit 910 across the insert surface. In some exemplary embodiments, the result at 630 may be dipped into the reservoir and, once removed from the reservoir, cured from the convex side of the part.

As previously discussed, the regions where light may proceed through the insert may have polymerized monomer mixture thereon, while other regions may have a coating of non-polymerized or partially polymerized monomer mixture thereon. The use of fluent media to flow across the surface of a lens precursor combined with the potential of adding monomer mixture to the surface as fluent media may result in a product with a fully encapsulated insert.

Figure 10:
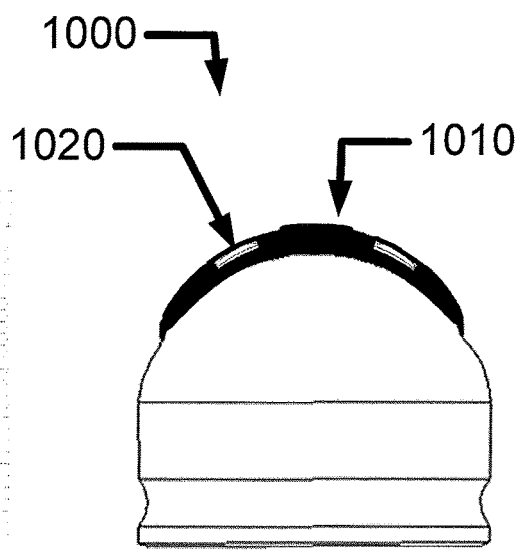
FIG. 10 illustrates an exemplary embodiment of an apparatus where annular inserts are employed where a customized optic zone may be produced using freeform methods.

Referring to FIG. 10, an example of an embodiment 1000 that may include an annular insert may be illustrated. In some such embodiments, the internal optic zone may be devoid of material, and a functional annular-shaped insert 1020 may be encapsulated within the material. An annular-shaped insert may not include material in the optic zone that may block, reflect, or absorb light from an illuminating source. Accordingly, the steps required to process the optic zone 1010 for vision-correction aspects may be similar to the processing of an ophthalmic lens without inserts.

Figure 11:
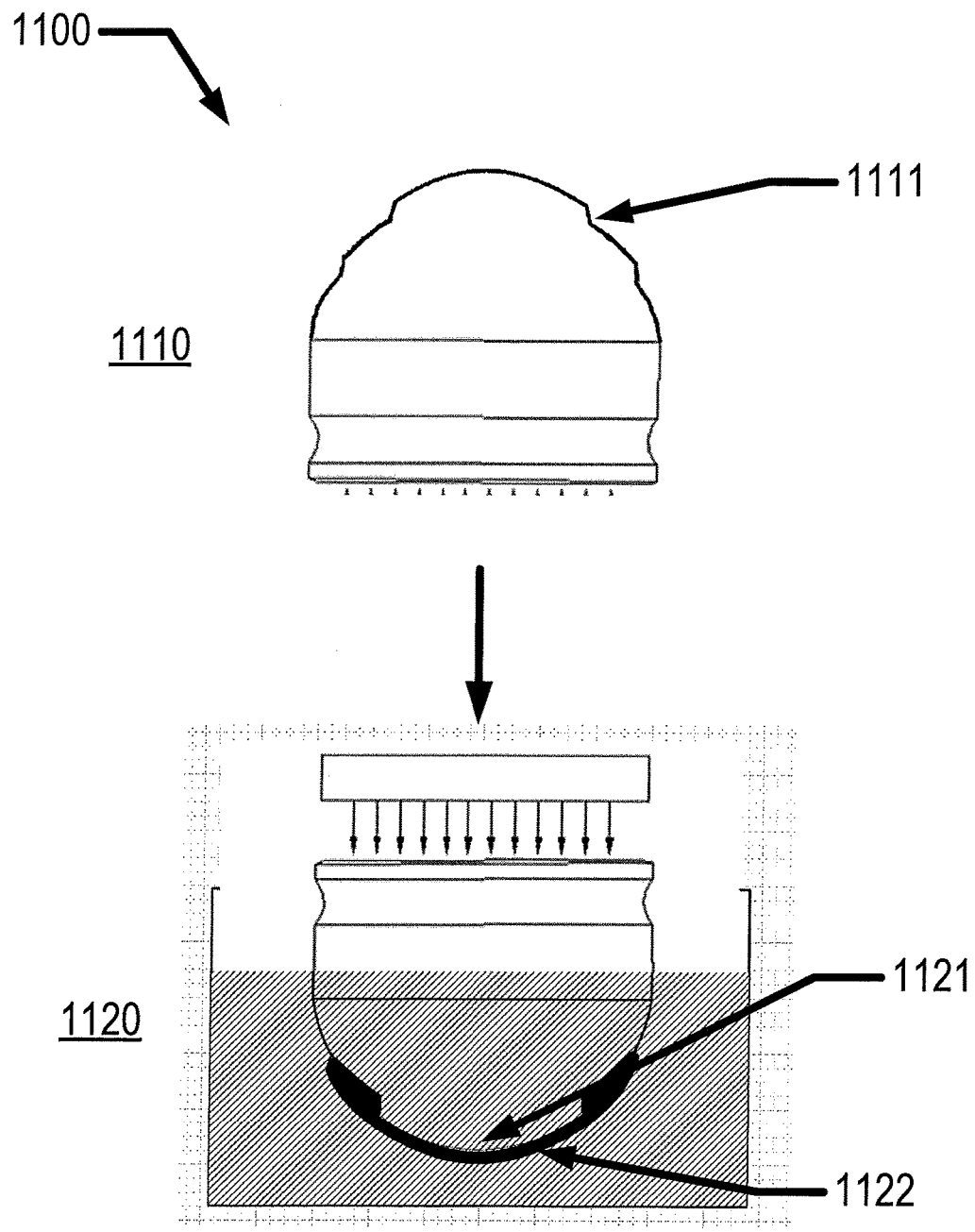
FIG. 11 illustrates an exemplary embodiment of an apparatus for forming an optic with insert pocket defining features that may be useful in implementing some embodiments of the present invention.

Referring to FIG. 11, an alternative exemplary embodiment of a precursor-forming apparatus 1100 to form encapsulated inserts within lenses utilizing the concepts of freeform processing are illustrated. An altered forming optic 1110 may have a feature 1111 upon its surface that may create a pocket in an ophthalmic device formed upon its surface. An extended feature 1121 may include polymerized material 1122 upon its surface, which may form a pocket. Since the polymerized device may be formed before the insert may be placed within or upon the polymerized material, the nature of the ophthalmic prescription or the optical parameters of the device formed may be imparted onto the polymerized material similarly to the freeform preparation of lenses without inserts with the analogous optical characteristics.

Referring to FIGS. 12A-12F, a process flow 1200 for forming a lens with insert through a free form process is illustrated, which may occur utilizing the exemplary embodiment of a forming optic 1110, 1211 demonstrated in FIG. 11. At step 1210, the forming optic 1211 may be placed into a reservoir 1212 filled with reactive monomer. In some exemplary embodiments, a lens precursor may be formed upon the forming optic 1211, and the forming optic 1211 with the attached lens precursor may be removed from the reservoir 1212. At step 1220, the lens precursor may be pressed into a holding fixture 1221. For illustrative purposes, the steps in FIGS. 12A-12F refer to a lens precursor, but in other exemplary embodiments, a lens precursor form may also be effective.

In some aspects, the fixture 1221 may be defined so that the lens precursor makes contact only along its edge. By irradiating the lens precursor through the forming optic with fixing radiation, the lens precursor may be fixed where the periphery may be attached to the holding fixture 1221 and the optic zone region forms a non-attached lens surface 1222. At step 1230, the forming optic 1211 may be released from the polymerized material. The release may be facilitated by the use of release agents upon the forming optic 1211 surface. Alternatively, physical stress may allow for the removal of the lens from the forming optic 1211.

At step 1240, an insert 1241 may be placed into the pocket formed in the biocompatible polymerized material device. Reactive monomer mixture may be added upon the insert 1241 device utilizing a variety of methods, for example, through injection. In some exemplary embodiments, at step 1250, the added monomer mixture may be molded by a back curve feature 1251. At step 1260, the mold 1221, 1251 and monomer mixture may be subjected to radiation to polymerize the monomer in an encapsulating biocompatible polymerized material 1262 of lens material around the lens insert 1241. In exemplary embodiments, the back curve feature 1251 may be separated from the mold 1221. The ophthalmic lens 1262, 1241 may be removed from the mold 1221 and hydrated.

In some embodiments, the separation of the back curve feature 1251 from the mold 1221 may occur through a mechanical separation between the two parts 1251, 1221. Once separated, the ophthalmic lens 1262, 1241 may be released from the mold 1221 or the back curve feature 1251, for example, by physical stress. Alternatively, one or both the back curve feature 1251 and the mold 1221 may be dissolvable. Such examples may reduce the stress of the demolding process on the ophthalmic lens 1262, 1241 and, accordingly, may reduce the potential to damage the ophthalmic lens 1241, 1262.

In some exemplary embodiments, the contact area between the soft lens portion 1262 and the mold 1221 may be disproportionate to the contact area between the soft lens portion 1262 and the back curve feature 1251. During demolding, the ophthalmic lens 1262, 1241 may remain attached to the molding part with the most contact area, while allowing for the molding part with the least contact area to release the ophthalmic lens 1262, 1241. Such an embodiment may ensure the ophthalmic lens 1262, 1241 remains attached to the dissolvable molding part.

The ophthalmic lens 1262, 1241 and the dissolvable molding part may be placed in a solution, wherein the molding part may be dissolved away from the ophthalmic lens 1262, 1241. In some exemplary embodiments, the molding part may be dissolved in an aqueous solution, which may also be capable of hydrating the ophthalmic lens 1262, 1241.

In other exemplary embodiments, both the mold 1221 and the back curve feature 1251 may be dissolvable, and a mechanical demolding process may not be necessary. After the polymerizing step at 1260, the molding parts 1221, 1251 and the molded ophthalmic lens 1241, 1262 may be placed in a solution, allowing the mold 1221 and the back curve feature 1251 to dissolve away from the ophthalmic lens 1241, 1262. In some examples, the dissolution step may occur separately from the hydration step, wherein the ophthalmic lens 1241, 1262 may tolerate the dissolving solution. Alternatively, the dissolving solution may be aqueous, and the dissolution step may be integrated with the hydration process.

Referring to FIGS. 13A-13F, an alternative exemplary embodiment of a processing flow 1300 is illustrated. In some such embodiments, at step 1310, the forming optic 1311 may be placed into a reservoir 1312 containing reactive monomer. A lens precursor may be formed upon the forming optic 1311, and the forming optic 1311 with the attached lens precursor may be removed from the reservoir. At step 1320, the lens precursor may be pressed into a holding fixture 1321. The fixture 1321 may be defined to allow the lens precursor to make contact with the fixture 1321 only along the edge of the lens precursor.

By irradiating the lens precursor through the forming optic 1311 with fixing radiation, the lens precursor may be temporarily fixed to the holding fixture 1321 where the periphery of the lens precursor may be attached, and the optic zone region may form an unattached lens surface 1322. At step 1330, in some exemplary embodiments, the forming optic 1311 may be released from the polymerized material. The release may be facilitated through the use of release agents upon the forming optic surface. Alternatively, the lens precursor may be removed from the forming optic 1311 by physical stress.

At step 1340, an insert 1341 may be placed into the pocket formed in the biocompatible polymerized material device. In some such embodiments, at step 1350, reactive monomer mixture 1351 may be added to a reservoir that may contain the holding fixture 1321 and the attached lens precursor. The holding fixture 1321 and reactive monomer mixture 1351 may be subjected to radiation through the holding fixture 1321 to polymerize the monomer 1351 into an encapsulating biocompatible material around the lens insert 1341. At step 1360, the reactive monomer mixture 1351 may be removed, and, in some exemplary embodiments, the resulting product may be inverted to allow for fluent material to flow over the surface before it the lens may be further irradiated. The fluent material may then be polymerized by exposure to actinic radiation, which may not be applied on a voxel by voxel basis.

In some exemplary embodiments, the actinic radiation may not be able to effectively penetrate the insert 1341. This may be particularly true where the insert 1341 comprises a media insert, wherein the insert 1341 includes electronic components. In some such embodiments, the media insert may be designed to allow the actinic radiation to penetrate a predefined area. The step at 1360 may be sufficient to form the ophthalmic lens in such aspects.

Alternatively, at step 1350, the actinic radiation may not be directed through the holding fixture. In such exemplary embodiments, a second forming optic may be placed proximate to the insert in a location that may allow the reactive monomer mixture to enclose the insert within the pocket. In some aspects, the reactive monomer mixture may be polymerized on a voxel by voxel basis utilizing a freeform technique. In such aspects, the fluent non-polymerized portion may be the portion closer to the forming optic, which may allow the fluent portion to flow over the surface that may be in contact with the eye. A further exposure to actinic radiation, such as at 1360, may polymerize the fluent media forming the ophthalmic lens with insert.

Alternatively, the forming optic may function similarly to a back curve mold part, wherein the position of the forming optic relative to the lens precursor and insert may define the shape and dimensions of the back curve portion of the ophthalmic lens. In such exemplary embodiments, the actinic radiation through the forming optic may not need to control polymerization on a voxel by voxel basis. Accordingly, a further step, such as at step 1360, where the fluent media may flow over the voxels of polymerized reactive monomer mixture, may not be necessary.

Although shown and described in what is believed to be the most practical and preferred embodiments, it may be apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

The invention claimed is:

1. A method of forming an ophthalmic lens with an insert, the method comprising:
    placing a forming optic in contact with a first reactive monomer mixture, wherein the forming optic comprises a forming surface with dimensions and curvature consistent with a back curve of an ophthalmic lens;
    forming a lens precursor with a pocket-like depression feature by exposing the first reactive monomer mixture to actinic radiation, wherein the actinic radiation is configured to control polymerization on a voxel by voxel basis over the forming surface;
    removing the forming optic and the lens precursor from contact with the first reactive monomer mixture, wherein the lens precursor comprises a first surface portion in contact with the forming optic, wherein the first surface portion comprises an optical quality surface, a second gelled surface portion, the second gelled surface portion comprising non-fluent polymerized material and a third surface portion comprising fluent partially polymerized material separate from the first reactive monomer mixture, wherein the third surface portion is located on a distal end of the lens precursor from the forming surface, and the material between the first surface portion and the second gelled surface portion comprising non-fluent polymerized material;
    placing an insert proximate to the third surface portion, wherein the boundary and elevation geometry of the pocket-like depression feature in the second gelled surface portion defines the location of the insert within the ophthalmic lens,
    wherein the fluent partially polymerized material from the third surface portion is in direct contact with and may flow onto at least a portion of the insert;
    adding reactive monomer mixture to the third surface portion or uncovered distal surface portion of the insert prior to exposing the fluent partially polymerized material to actinic radiation;
    allowing the added material to flow and stabilize;
    forming the ophthalmic lens by exposing the fluent partially polymerized material to actinic radiation; and
    releasing the ophthalmic lens from the forming optic.

2. The method of claim 1, wherein the reactive monomer mixture is configured to promote adhesion between the insert and the first lens precursor.

3. The method of claim 1, wherein the forming optic comprises a concave surface, wherein the first surface comprises a convex portion of the ophthalmic lens.

4. The method of claim 1, wherein the forming optic comprises a convex surface, wherein the first surface comprises a concave portion of the ophthalmic lens.

5. The method of claim 1, further comprising the method steps of:
    placing the lens precursor and the insert in contact with a second reactive monomer mixture, wherein the reactive monomer mixture is capable of engulfing the insert into the first lens precursor;
    forming a second lens precursor, wherein the second lens precursor comprises the first lens precursor and the insert, by exposing, in a path through the forming optic, the second reactive monomer mixture to the actinic radiation, wherein the second lens precursor comprises non-fluent polymerized material; and
    removing the forming optic and second ophthalmic lens precursor from contact with the reactive monomer mixture.

6. The method of claim 1, wherein the insert comprises a media insert, wherein the media insert comprises:
    a power source;
    an energizable element in electrical communication with the first processor and the power source, wherein the energizable element is configured to provide a functionality to the ophthalmic lens;
    a first processor in electrical communication with the power source, wherein the processor comprises a first executable software, wherein the first executable software is configured to control the energizable element based on the set of programming parameters; and
    conductive traces configured to allow electrical communication between the processor and the power source.

7. The method of claim 5, wherein the placing the first lens precursor and the insert in contact with a second reactive monomer mixture comprises placing the lens precursor and the insert in proximity to a spraying mechanism, wherein the spraying mechanism is configured to cause the second reactive monomer mixture to engulf the first lens precursor and insert.

8. The method of claim 5, wherein the placing of the first lens precursor and the insert in contact with a second reactive monomer mixture comprises placing the first lens precursor and the insert in a bath of second reactive monomer mixture.

9. The method of claim 6, wherein the energizable element further comprises a variable optic portion configured to provide a plurality of optic powers.

10. The method of claim 9, wherein the variable optic portion comprises a liquid meniscus.

11. The method of claim 9, wherein the variable optic portion comprises a liquid crystal.

12. The method of claim 1, wherein the reactive monomer mixture is added to the third surface portion via at least one of spraying, dipping or printing.

13. The method of claim 1, wherein the reactive monomer mixture is added to the third surface portion only along the edge of the distal surface portion of the insert.

\* \* \* \* \*